United States Patent
Boosen

[15] 3,691,171
[45] Sept. 12, 1972

[54] PROCESS FOR MAKING 2-HYDROXYQUINOLINE-4-CARBOXYLIC ACIDS

[72] Inventor: Karl-Josef Boosen, La Neuveville, Switzerland

[73] Assignee: Lonza Ltd., Basle, Switzerland

[22] Filed: May 26, 1970

[21] Appl. No.: 40,696

[30] Foreign Application Priority Data

May 29, 1969   Switzerland...............8109/69

[52] U.S. Cl. ......260/287 R, 260/283 SY, 260/289 R
[51] Int. Cl. .............................................C07d 33/48
[58] Field of Search...........................260/287 R, 640

[56] References Cited

UNITED STATES PATENTS 3,391,146   7/1968   Godfrey....................260/287

OTHER PUBLICATIONS

Roempp " Chemie Lexigon," 6 Auflage, Band III, p. 4742 ( 1966).

Primary Examiner—Donald G. Daus
Attorney—Henry T. Burke, Robert Scobey, Robert S. Dunham, P. E. Henninger, Lester W. Clark, Gerald W. Griffin, Thomas F. Moran, R. Bradlee Boal and Christopher C. Dunham

[57]   ABSTRACT

Process for the preparation of 2-hydroxyquinoline-4-carboxylic acids in which 2-hydroxy-4-halogenomethyl-quinoline is oxidized with a controlled excess of alkaline hydrogen peroxide.

6 Claims, No Drawings

PROCESS FOR MAKING 2-HYDROXYQUINOLINE-4-CARBOXYLIC ACIDS

BACKGROUND OF INVENTION

The 8-methyl substituted and 8-chlorine substituted 2-hydroxyquinoline-4-carboxylic acids have known utility as intermediates for the production of pharmaceutically useful compounds, especially local anesthetics. They have been prepared by various methods. For example, 2-hydroxyquinoline-4-carboxylic acid has been obtained from isatin, which is in turn prepared by oxidizing indigo with nitric or chromic acid. In the procedure isatin is reacted with acetic anhydride at a temperature of from 210°C. to 220°C. at a pressure of about fourteen atmospheres, absolute. The yields obtained are about 65 to 72 percent, and these are comparable with yields obtained in the preparation of homologs and analogs by other procedures.

THE INVENTION

It has now been found that 2-hydroxyquinoline-4-carboxylic acids can be prepared in high yield and purity by a much less rigorous method which does not require high temperatures and pressures.

In accordance with the invention the desired result is obtained by reacting the starting compound with a controlled excess of alkaline hydrogen peroxide to effect oxidation to the final product. The selected 2-hydroxy-4-halogenomethyl quinoline is reacted with hydrogen peroxide at a mole ratio of from 1:10 to 1:20 between the starting material and the hydrogen peroxide in an aqueous solution containing an alkali metal hydroxide at a mole ratio of from 1:6 to 1:15 between the starting material and the hydroxide. The temperature of the reaction is from about 35°C. to 70°C. The product obtained is an alkali metal salt of the 2-hydroxyquinoline-4-carboxylic acid, and the free acid is obtained by acidifying with a non-oxidizing acid, suitably a mineral acid such as hydrochloric, sulfuric or phosphoric acid. For the separation the acidity of the solution is brought to a pH of from about 1 to 4 to precipitate the acid.

The reaction takes place, as described above, in the presence of an excess of hydrogen peroxide and alkaline agent, e.g., alkali hydroxide. However, care must be taken that not too large an excess is employed, otherwise there is the danger that strong hydrolysis will take place and instead of the desired final product, a 2-hydroxy-4-hydroxymethylquinoline is obtained. For this reason care must be exercised that the amount of hydrogen peroxide and alkaline agent employed do not vary appreciably from the range set forth above. In fact it is preferred that the mole ratio of starting material to hydrogen peroxide is from 1:15 to 1:20 and to alkali hydroxide is 1:10 to 1:12.

The preferred procedure is to feed the aqueous solution of alkali metal hydroxide first, heat it to a temperature preferably about 50°C. and 70°C. and to simultaneously add the hydrogen peroxide and the starting compound in the desired quantities at a rate so as to maintain the temperature in the range 50°C. to 70°C.

Although appreciable variation in the concentration of hydrogen peroxide and alkali metal hydroxide can be tolerated, so long as the mole ratios are as described above, it is preferred that the concentration of used hydrogen peroxide solution be from about 25 to 35 percent, suitably 30 percent, and the used alkali hydroxide solution be from about 9 to 16 percent.

While the 4-chloromethyl compound is the preferred starting material, other halogenated compounds, for example, the bromo, iodo or fluoro compound can be employed, and these can be readily prepared.

Alkali metal oxides and hydroxides can be used as alkaline agents, although sodium and potassium hydroxide are preferred because of their ready availability. In any event, in aqueous solution they may be considered as alkaline hydroxides.

The reaction time can vary within wide limits, and the optimum time for particular reactants can be readily determined by simple tests of the peroxide content of the reaction mixture with elapsed time. Usually the reaction is complete in from about 4 to 8 hours.

After the reaction is complete, the free quinolinecarboxylic acid is liberated by acidification with non-oxidizing mineral acids, such as hydrochloric, sulphuric, or phosphoric acid. The acidity, as described above, is preferably brought to a pH of 1 to 4. The quinolinecarboxylic acid is then separated, preferably by filtration at temperatures below room temperature, washed and dried.

The product is preferably dried in a vacuum (approximately 10 to 25 mm Hg). If drying temperatures of 50°–60C. are used, the 2-hydroxyquinoline-4-carboxylic acid is obtained with 1 mol water of crystallization. If the temperatures are 130°C. to 150°C. the acid is obtained free of water in the anhydrous form.

The 2-hydroxyquinoline-4-carboxylic acids prepared may optionally bear any substituent on the quinoline nucleus, particularly alkyl or halogen substituents at the 8-position.

The 2-hydroxy-4-halogenmethylquinolines are easily obtained and with a high yield from the corresponding anilides of gamma-halogenacetoneacetic acids. These in turn can be obtained by chlorination of diketenes and subsequent reaction of the gamma-halogenacetonacetic acid products with the suitable aromatic amines and further closing of the ring with the help of concentrated sulphuric acid.

The following non-limiting examples are given by way of illustration only.

EXAMPLE 1

Twenty-four g. of NaOH and 150 ml water were placed into a 2-liter flask with four orifices, and heated to 50°C.; 100 ml 30 percent hydrogen peroxide and 9.7 g. 2-hydroxy-4-chloromethylquinoline were added simultaneously during an interval of 20 minutes and the temperature was maintained at 50° C. for 8 hours. The aqueous solution was then filtered, acidified with 200 ml aqueous hydrochloric acid (1:1), cooled at 10°C. and the desired product recovered as a precipitate by filtration and dried in a vacuum (20 mm Hg) at 150°C. After the material was recrystallized from glacial acetic acid or ethanol, 7.6 g. (approximately 80 percent of the theoretical yield) of 2-hydroxyquinoline-4-carboxylic acid were obtained. The melting point was 335°–340 °C., the purity, from potentiometric titration, was 99.9 percent.

EXAMPLE 2

Thirty-four g. KOH and 200 ml water were placed in the flask, as in Example 1, and 125 ml $H_2O_2$ (30 percent) were added, simultaneously with 19.4 g. 2-hydroxy-4-chloromethylquinoline, during an interval of 30 minutes, at 50°C. The temperature was kept at 50°C. for 8 hours. After filtration the product was acidified with aqueous hydrochloric acid (1:1) to a pH of 2. The mixture was cooled to 10°C. the 2-hydroxyquinoline-4-carboxylic acid was separated, dried in vacuum at 150°C. and recrystallized as described above. The result was 15.0 g. or approximately 84 percent of the theoretical yield of hydroxyquinoline carboxylic acid with a melting point of 335°–340°C.

EXAMPLE 3

2-hydroxy-4-bromomethylquinoline was oxidized, as described in Example 1, and then treated further as described above. After recrystallization from glacial acetic acid a yield of 68 percent of 2hydroxyquinoline-4-carboxylic acid was obtained.

EXAMPLE 4

22.5 (0.1 mol) gamma-chloroacetonaceto-2-toluidine were heated to 90°C. to 100°C. for 20 minutes in 30 ml concentrated sulphuric acid. After cooling the solution was poured into 1 liter water and the precipitate recovered by filtration and washed. The result of this reaction was 17.5 g. 2-hydroxy-4-chloromethyl-8-methylquinoline (yield equal to 84.6 percent of the theoretical value). The melting point was between 218°C. and 220°C. This 2-hydroxy-4-chloromethyl-8-methylquinoline was oxidized in a manner analogous to that of Example 1. After further treatment and recrystallization from glacial acetic acid there were obtained 11.1 g. (corresponding to 54.7 percent of the theoretical value) of 2-hydroxy-8-methylquinoline-4-carboxylic acid with a melting point of 312°C. to 315°C. The purity was 99.8 percent.

EXAMPLE 5

Eighty-seven g. (0.35 mol) gamma-chloroacetonacetic-2-chloroanilide were treated with 450 ml concentrated sulphuric acid at 20°C. during 16 hours. After pouring into water the precipitate was recovered by filtration and washed. The resulting product was 57 g. (corresponding to 72.3 percent) of 2-hydroxy-4-chloromethyl-8-chloroquinoline with a melting point of 187°C. to 188°C. (recrystallized from glacial acetic acid). The oxidation was effected in accordance with Example 1. The results was 2-hydroxy-8-chloroquinoline-4-carboxylic acid with a yield of 85.5 percent. The melting point was between 330°C. and 332°C. and the purity was 99 percent.

What is claimed is:

1. A process for the preparation of 2-hydroxy-quinoline-4-carboxylic acids which comprises oxidizing the corresponding 2-hydroxy-4-halogenomethylquinoline by reaction with aqueous alkaline hydrogen peroxide at a temperature of from about 35°C. to 70°C. utilizing a mole ratio of starting material to hydrogen peroxide of from about 1:10 to 1:20, and starting material to alkali hydroxide of 1:6 to 1:15 and thereafter acidifying the mixture with a strong non-oxidizing acid.

2. A process as in claim 1 wherein the temperature is from 50°C. to 70°C.

3. A process as in claim 1 wherein the alkaline solution is preheated to about 35°C. to 70°C. and the hydrogen peroxide and starting material are added simultaneously at a rate to maintain the reaction temperature at from about 35°C. to 70°C.

4. A process as in claim 1 wherein the mol ratio of starting material to alkali hydroxide is from 1:10 to 1:12.

5. A process as in claim 1 in which the concentration of the alkali hydroxide is from about 9 to 16 percent.

6. A process as in claim 1 wherein the mol ratio of starting material to hydrogen peroxide is 1:15 to 1:20.

* * * * *